United States Patent

Holbrook et al.

[15] 3,704,724

[45] Dec. 5, 1972

[54] FLUID LEVEL SENSING/CONTROL SYSTEMS

[72] Inventors: Legrand K. Holbrook, Salt Lake City, Utah 84108; David S. Ostler, Salt Lake City, Utah 84117

[73] Assignee: Medical Development Corporation, Salt Lake City, Utah

[22] Filed: Feb. 24, 1970

[21] Appl. No.: 13,585

[52] U.S. Cl..................................137/392, 137/558
[51] Int. Cl........:..........................................G05d 9/12
[58] Field of Search......137/386, 389, 390, 392, 558; 200/61.04, 152.4; 141/95, 372; 128/276, 278; 340/244 C

[56] References Cited

UNITED STATES PATENTS

| | | | |
|---|---|---|---|
| 2,639,078 | 5/1953 | Karlen | 137/386 X |
| 3,408,941 | 11/1968 | Sorensen | 137/392 X |
| 3,339,578 | 9/1967 | Smith | 137/392 |
| 3,008,133 | 11/1961 | Conigliaro | 340/272 X |
| 3,485,262 | 12/1969 | Perren | 137/392 X |

*Primary Examiner*—M. Cary Nelson
*Assistant Examiner*—David R. Matthews
*Attorney*—M. Ralph Shaffer

[57] ABSTRACT

The present invention comprises a fluid level sensing and/or control system whereby the rise of a given, electrical-parameter affecting fluid to a given level within a container, can be sensed and/or utilized advantageously to actuate a given object. Where such object is an indicator unit, then the same may have an input responsive to fluid level rise at a given level, to alter the electrical characteristic of such input. In one form of the invention, electrically conductive means communicate with the interior of the container of the system, at a predetermined level or area thereof, such that when the fluid level rises at this level, the fluid itself may complete or otherwise affect an associated circuit, through such electrically conductive means, to the indicator employed. The indicator may be miniaturized to provide a signal generator responsive to fluid level rise for generating an audible or other signal.

15 Claims, 19 Drawing Figures

PATENTED DEC 5 1972
3,704,724
SHEET 1 OF 3
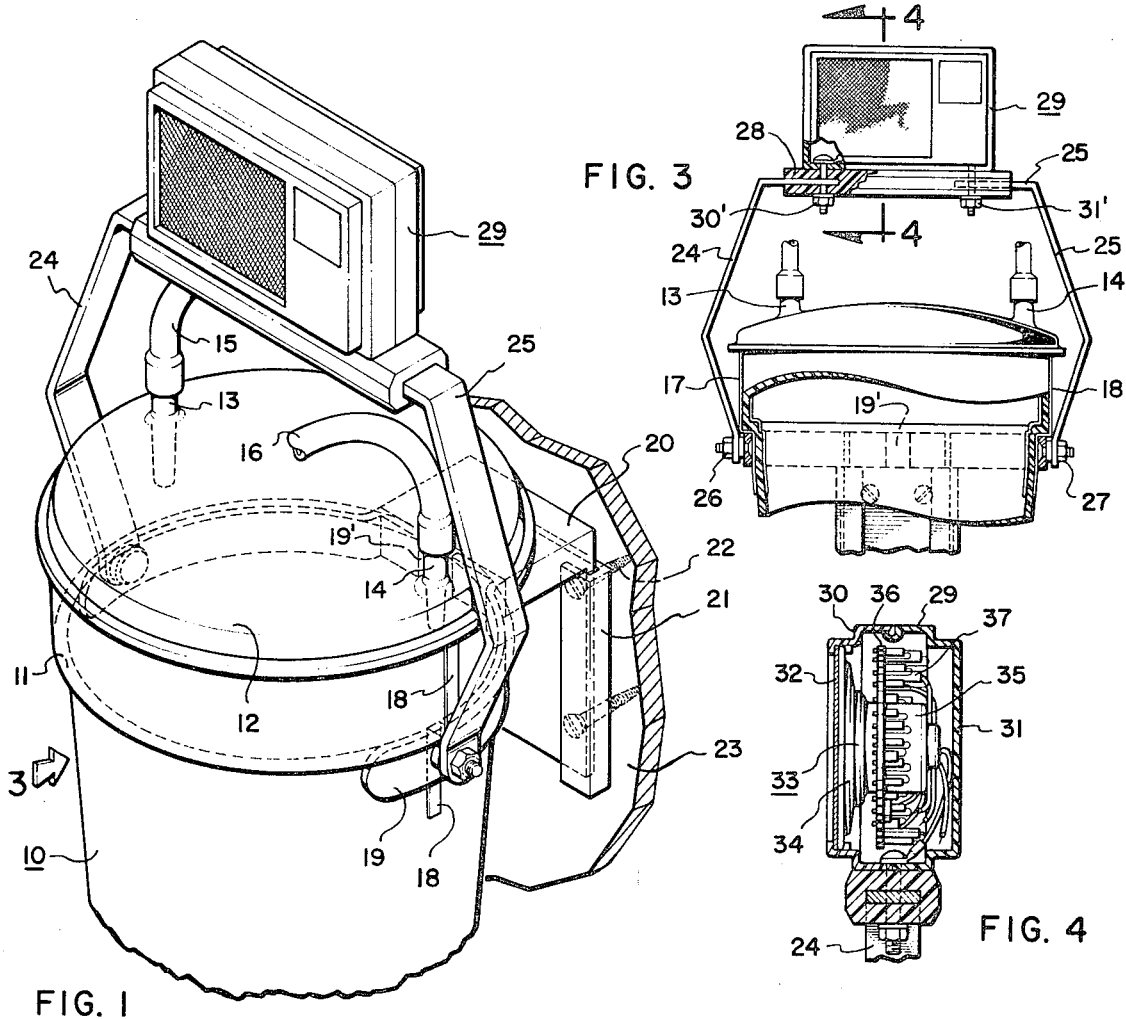
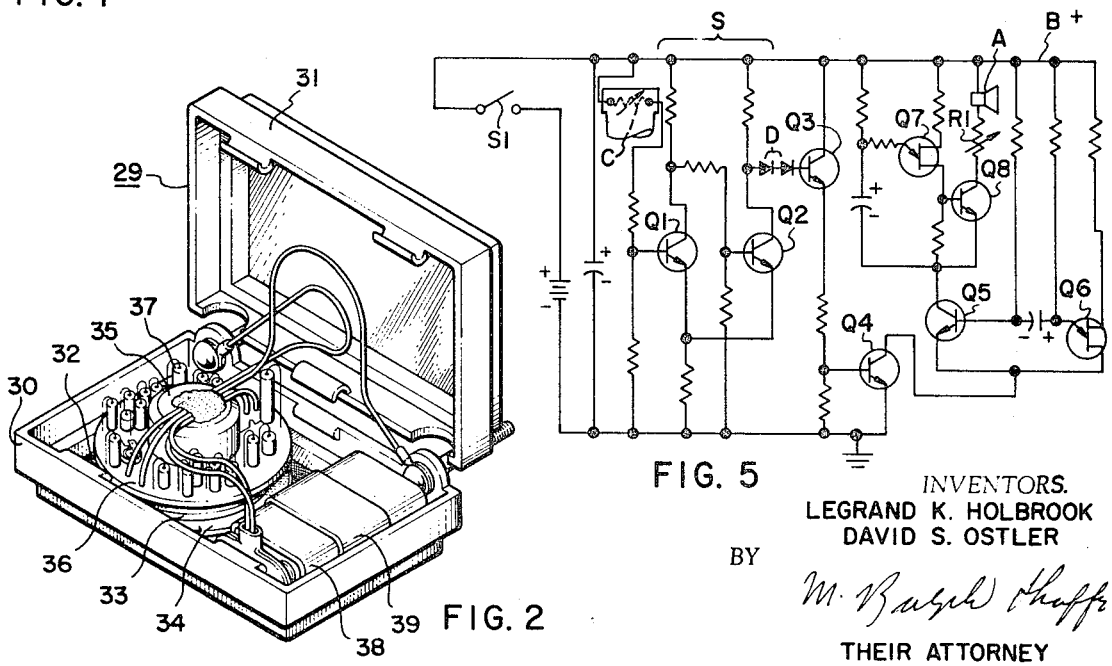
INVENTORS.
LEGRAND K. HOLBROOK
DAVID S. OSTLER
BY M. Ralph Shaffer
THEIR ATTORNEY

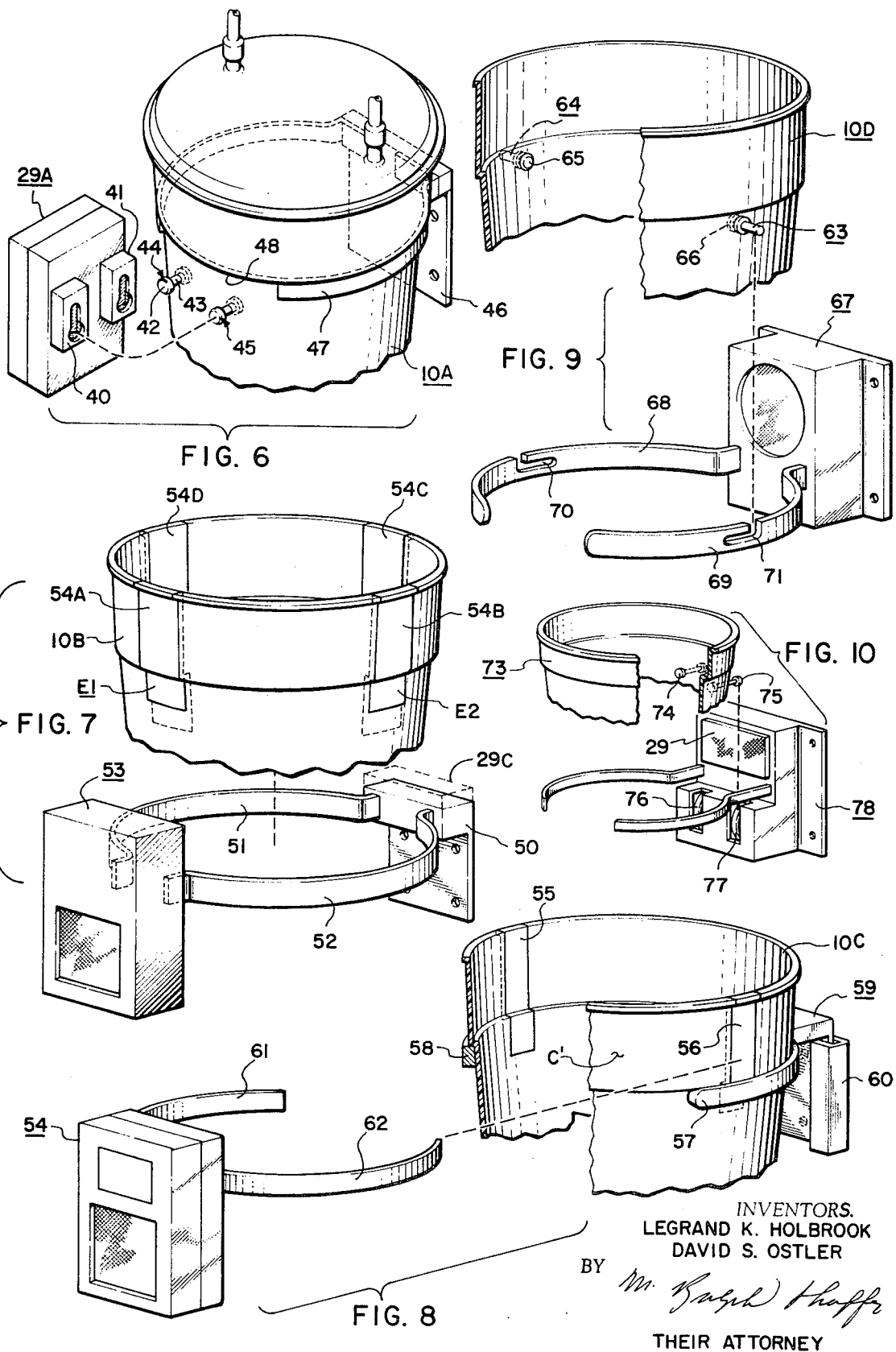

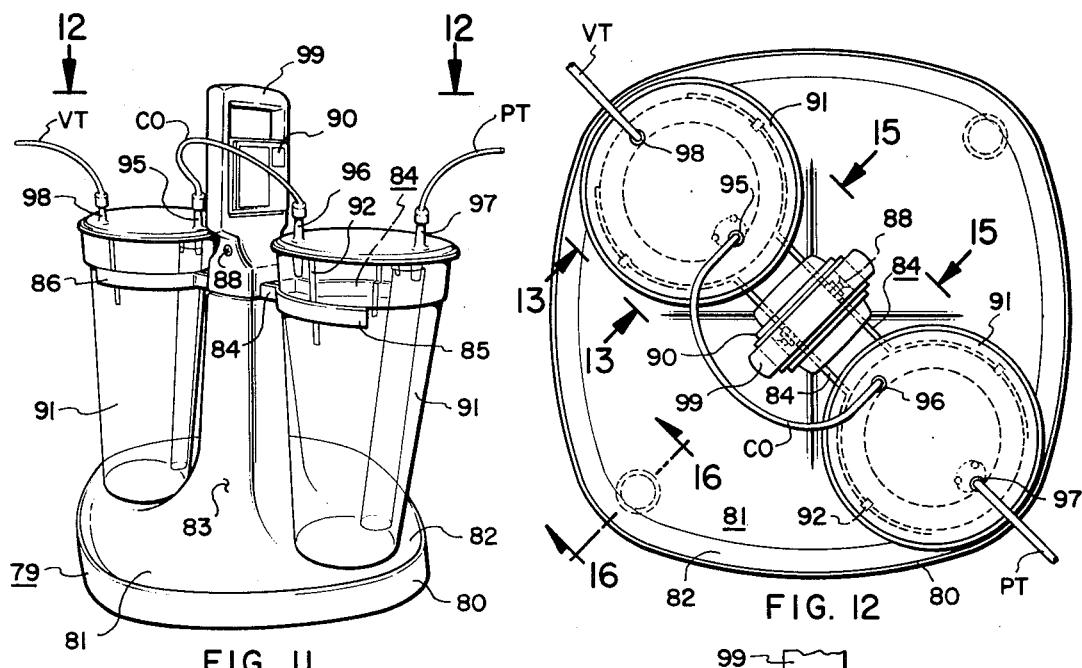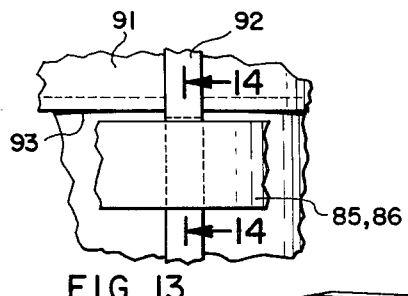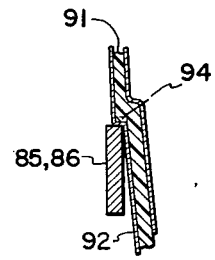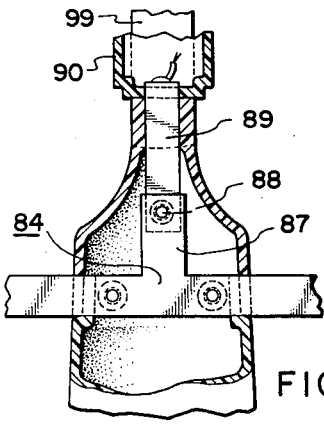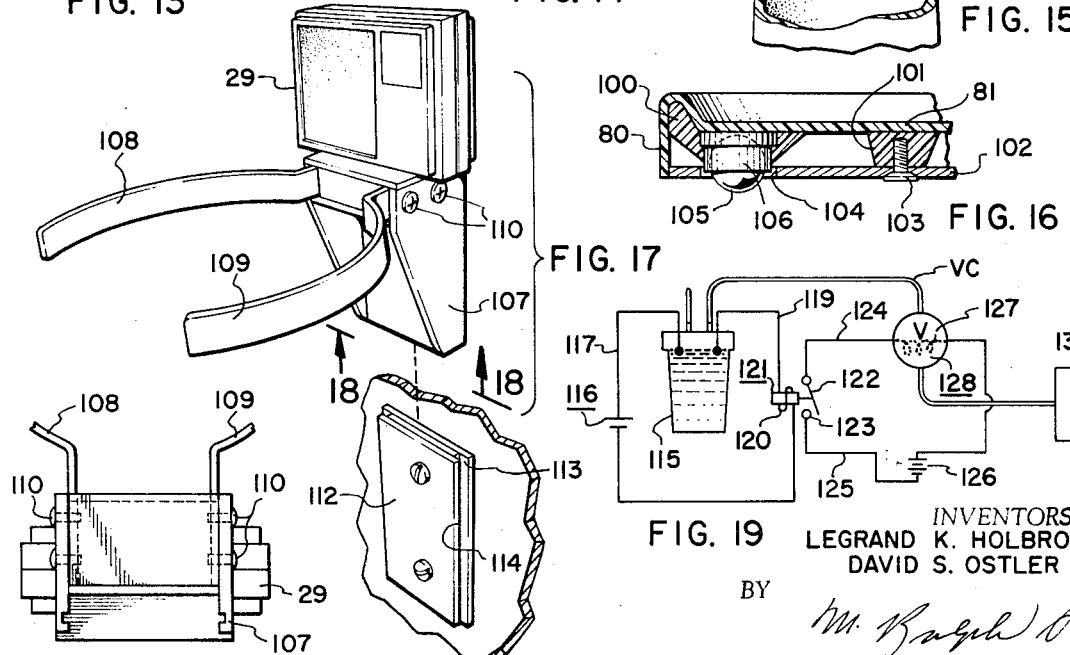

3,704,724

FLUID LEVEL SENSING/CONTROL SYSTEMS

The present invention relates to fluid level sensing systems, and more particularly, to a new and improved system whereby electric parameter change by, or current flow through, the rising fluid is relied upon to perform a selected function such as trigger a signal generating means to indicate that a particular level in a container employing the system has been reached.

By way of example, blood collection systems in the surgery and recovery rooms of hospitals collect body fluid and deliver the same to a permanent or disposable container. It becomes desirable for hospital personnel to be aware of the fact that the container used has become filled, or nearly so; in such event, the container will be replaced, body fluid will be shunted to another container, and so forth.

The crux of one phase of the present invention resides in the passing of electrical current through the rising fluid when the same reaches a pre-determined level, this so as to trigger or actuate an electronic, electric, or electro-mechanical circuit, to give a desired result such as the production of an audible signal. There are many embodiments and uses for such a system, not only as to the production of audible signals, but visual signals, electromechanical responses, and so forth.

Accordingly, a principal object of the present invention is to provide a new and improved fluid level sensing and/or control system, to actuate, complete, trigger, or otherwise affect another object.

A further object is to provide, for a fluid level system, a container having electrically conductive means disposed in communication with the interior of such container for sensing fluid level rise thereto and being responsive to the same to actuate an external circuit or device.

An additional object of the invention is to provide a fluid level sensing system incorporating a unit, responsive to the electrically conductive means of a container within a unit, for generating a desired response.

An additional object is to provide a miniaturized indicator unit for a fluid level sensing systems, for example, wherein the circuitry thereof is conveniently mounted to accommodate miniaturization of the unit.

The features of the present invention which are believed to be novel, are set forth with particularity in the appended claims. The present invention, both as to its organization and manner of operation, together with further objects and advantages thereof, may best be understood by reference to the following description, taken in connection with the accompanying drawings, in which:

FIG. 1 is a fragmentary perspective view of a fluid level sensing system constructed in accordance with one embodiment of the present invention.

FIG. 2 is a perspective view of a utilized indicator unit, when opened, and indicates the compact and miniaturized nature of the electronic circuitry associated with such unit.

FIG. 3 is a fragmentary, front elevation in reduced scale of the structure shown in FIG. 1 and is taken along the arrow 3 in FIG. 1.

FIG. 4 is an enlarged fragmentary section taken along the line 4—4 in FIG. 3.

FIG. 5 is a schematic detail of a representative electronic circuit which may be incorporated in the indicator unit, of FIGS. 1–3.

FIG. 6 is a fragmentary, exploded, perspective view of a fluid level sensing system constructed in accordance with a second embodiment of the invention wherein the indicator unit is releasably mounted directly to the container of the system.

FIG. 7 is a fragmentary, exploded view of another embodiment of the present invention, illustrating the indicator unit as being attached to a wall bracket.

FIG. 8 is an exploded, perspective view of another embodiment of the invention illustrating a further arrangement of the indicator unit relative to the wall bracket supporting structure.

FIG. 9 is a fragmentary, exploded view of still another embodiment of the invention wherein the indicator unit is made a part of the wall supporting structure.

FIG. 10 is a fragmentary, exploded view of still another embodiment of the present invention.

FIG. 11 is a perspective view of a two-container caddy assembly.

FIG. 12–16 are top plan, fragmentary elevation, fragmentary section, enlarged fragmentary section, and base fragmentary section views of the FIG. 11 structure at various points as indicated by corresponding numerals.

FIG. 17 is an exploded view of an optional container bracket and mount assembly.

FIG. 18 is in enlarged detail taken along the line 18—18 in FIG. 17.

FIG. 19 is a view principally in schematic form of still another embodiment of the present invention.

DETAILED DESCRIPTION

In FIG. 1, container 10 includes an outwardly extending peripheral margin 11 over which is fitted a cover 12. The cover 12 is provided with fluid inlet port 13, as well as vacuum port 14. Both, as shown in FIGS. 1 and 3, are provided with hoses 15 and 16, leading to a patient suction device and a vacuum system respectively, not shown.

Container 10 is provided with opposite conductive elements 17 and 18, such as adhesive backed aluminum strips, which are in respective general hairpin configuration, respectively extending from the interior of container 10 to the exterior thereof. See FIG. 3. Arcuate support 19, opposite conductive halves of which are insulated by non-conductive segment 19', is affixed to an inverted L-configured bracket 20, the latter which slips into bracket retainer 21. The retainer 21 comprises an undercut channel which is affixed by screws or other means 22 to wall 23.

There may be fastened to arcuate support 19 a pair of electrically conductive legs 24 and 25, this by respective attachments 26 and 27, as shown. Legs 24 and 25 may be secured to insulative base 28, the latter forming a part of "fill" indicator unit 29. Attachments 30' and 31' may provide a physical securement as between legs 24 and 25, and unit 29.

Unit 29 includes a case comprising case halves 30 and 31, see FIG. 4. These cases halves may snap together, with one of the case halves receiving and tightly containing the rim 32 of speaker 33. Speaker 33 includes, of course, the usual cone 34 and voice coil housing 35. Directly mounted to the latter may be a phenolic or other printed circuit board 36 which is photo-etched or otherwise provided with a printed circuit accommodating the various circuit elements 37.

To complete the structure as illustrated in FIG. 2, with the two halves 30 and 31 being opened to show the interior parts, battery 38 is snapped in place by clamp 39; representative electronic circuitry of the same is illustrated merely way of example, in FIG. 5.

In FIG. 5, circuit S simply comprises a conventional Schmidt trigger and includes transistor stages Q1, Q2, and battery input provided with on/off switch S1. The battery input of course, provides the B+ voltage at the line indicated as such. The particular container used is designated generally at C and corresponds to any one of the containers such as container 10 shown in FIG. 1. The system may be designed to be quite sensitive, such that the Schmidt trigger portion S of the circuitry is triggered for resistance as low as 500K. Hence, the fluid within the general container C of FIG. 5 may be made only slightly conductive and still be effective to trigger the system. By test, even a moist hand would suffice in permitting sufficient current to conduct between the conductive rivets, electrodes, or strips, so as to trigger the Schmidt trigger portion of the circuit. When switch S1 is closed, than the circuit is immediately ready for operation. In the absence of sufficient fluid rise within container C of FIG. 5 to the sensing level, then Q1 is maintained at ground position so as to be in an "off" state, whereas Q2 will be conductive. Once the fluid rises such as to allow conduction through the fluid and between the contacts, electrodes, strips, or conductive rivets of the container, then the resistance at C in FIG. 5 lessens so as to raise the base voltage at Q1. This in turn, turns Q2 off. The double diodes at D simply regulates the bias level of Q3. When Q2 is turned off, Q3 conducts and this turns on Q4. The circuitry, including transistors Q5 and Q6, comprises a conventional unijunction oscillator circuit, elements of which being chosen so that it will oscillate from 20 to 40 timers per minute. A second unijunction oscillator comprises the transistor stages of Q7 and Q8, the same producing oscillations of from 400 to 500 cycles per second, depending upon circuit constants. Accordingly, an intermittent buzzing sound will be heard in the speaker A, the volume of which may be regulated by R1.

In summary of operation, then, rising fluid level at container C in FIG. 5 (corresponding, for example, to container 10 in FIG. 1) will cause a conduction through the base circuit of Q1 of the Schmidt trigger, so as to turn on Q3, Q4, and the unijunction oscillator comprising Q5 and Q6. The stage comprising Q5 and Q6, in effect, pulses the pulser train output of the unijunction oscillator, comprising Q7 and Q8, so that intermittent buzzing may be heard in speaker A when the preselected fluid level has been reached.

It will be understood that various types of electric or electronic circuits may be used to convert any conductivity, as between conductive ribbons 17 and 18, into an intelligence signal such as an intermittent "bleep" or buzzer sound. The circuitry of FIG. 5 is ideally suited for such purposes and accommodates miniaturization, as illustrated in Figure 2. It is noted that printed circuit techniques may be incorporated and the entire printed circuit board mounted directly on the speaker, as illustrated in FIG. 4.

FIG. 6 illustrates another embodiment of the invention wherein the indicator unit, now designated 29A, includes rear, connector-receiving bases 40 and 41 which are recessed and key-slotted such as to receive the head and stem portions 42 and 43 of each of the connectors or terminals 44 and 45 of container 10A, in FIG. 6. Accordingly, a rise in fluid level to and/or beyond conductive elements 44 and 45 will produce a conduction through the external effective circuit, relative to indicator 29A, so as to cause the latter to create an audible sound, a light flash, or other intelligent indication showing that the container is full, or substantially so. In the case of the embodiment in FIG. 6, there may be merely included a wall bracket 46 having support band rigidly affixed thereto, the same for supporting container 10A at shoulder 48.

A further embodiment of the invention is illustrated in FIG. 7, wherein wall bracket 50 this time includes a pair of opposite, arcuate, electrically conductive bands 51 and 52, which terminate in an indicator unit 53. The latter may correspond as to electrical components, contour and function to that illustrated, relative to unit 29 in FIG. 1, 2 and 3. In the case of the structure shown in FIG. 7, the container 10B includes plural conductive ribbons 54A–54D, the outer lower extremities of which, as at E1 and E2, will engage conductive arms 51, 52. Optionally, there may be included an indicator unit 29C corresponding to unit 29 in FIG. 1. A top bracket 50 is provided, with the conductive arms 51 and 52 being connected to 29C, and coupled with the interior circuitry thereof in any convenient manner. In the case of such a construction, the additional indicator 53 need not be employed in FIG. 7.

In FIG. 8, it is seen that container 10C is again provided with electrically conductive strips 55, 56, the lower outer extremities of which may be selectively engaged by conductive band halves 57 and 58. The latter are secured to inverted L-shaped bracket 59 which is selectively deposited in under cut channel bracket 60 attached to the wall. In the case of FIG. 8, there is included opposite conductive bands 61 and 62 which are attached to indicator 54, corresponding in form to the indicator unit 29; arms 61 and 62 are electrically connected to the electronic circuitry of the same as heretofore indicated. It is seen that support arms 57 and 58 attached to bracket 59 may extend outwardly relative to the outer contour C' of the bottle or container 10C. Thus, it is seen that the arm 61 and 62 may be conveniently supported by arms 57 and 58. Where the arms 57 and 58 are made of conductive metal, then there should be a separate, plastic insulated segment between and/or joining the two. When the arms 57 and 58 are integrally formed, then the same should be made of a nonconductive plastic such as Plexiglass, for example.

In FIG. 9, container 10D will be formed substantially the same as container 10 in FIG. 1, but this time includes rivet terminals 63 and 64 which are secured to the sides of container 10 and which have interior portions 65 and 66 available for serving as contacts for rising conductive fluid therein.

Accordingly, an indicator unit 67, similar to unit 29 in FIG. 1–3, may be provided with electrically conductive arms 68 and 69, which arms are in turn provided with slots 70 and 71 as shown. These slots may receive rivets 63 and 64 via appropriate rotatable adjustment, this so that the container is secured in place by the conductive and supportive bands 68 and 69. Hence, the rise in fluid level will cause a shorting out or conduction between rivets or contacts 63 and 64 so that conduction is achieved at the input circuit of unit 67, this to cause an appropriate indication such as light or sound for the user.

The structure as thus far described operates as follows. In all of the embodiments as above described and illustrated in the drawings, a rise in fluid level such as body fluid, blood and so forth, will produce, by virtue of the nature of the fluid, a conductive circuit path between the conductive rivets or contacts associated with the respective containers of bottles 10–10D in the FIGS. This conductive condition may be utilized to produce current flow through the liquid and through the input circuit portion of the indicator unit, such as unit 29 in FIG. 3, by way of example. The same triggers the associated electronic circuitry, see FIG. 5, so as to produce an audible "bleep" or buzzer-type sound. This alerts the user that the bottle or container being used is nearly filled. In such event, the equipment is manually or automatically turned off so that the continued filling of the same is interrupted. Such interruption will allow for the replacement of the bottle or container being used, or for automatic filling of auxiliary containers (not shown), so that there will be no spillage, back-flow to patient, damage to vacuum system, or other deleterious effect.

The electronic circuitry may be miniaturized in the manner shown in FIGS. 2, 4 and 5, in order that the indicator unit may be easily mounted upon a wall bracket, upon the container itself, or an ancillary part thereto. Various means have been shown for facilitating fluid conduction at predetermined fill levels so that the electronic circuitry used can be triggered to produce the predetermined audible or visual indication.

In FIG. 10 the container 73 includes feed-through electrical contacts 74 and 75 which engage leaf spring 76 and 77 of bracket unit 78. The latter includes the usual indicator unit 29, with leaf spring contacts 76, 77 forming electrical contacts therefor as per the opposite extremities of C in FIG. 5.

Accordingly, in FIG. 10, when the container 73 is lowered, the contacts 74 and 75 will engage leaf spring contacts 76, 77 to make electrical connection to the electronic circuit at FIG. 5, by way of example.

In FIG. 11, a caddy 79 comprises a base 80 having recessed bed 81 as defined by an upstanding lip 82. Central post 83 is provided with a suitable mounting means for mounting electrically conductive arm members 84. Arm members 84 each comprise arm halves 85, 86 and has an upstanding conductive portion 87. The latter is bolted by suitable attachments 88 to depending prongs or electrical contacts 89 of alarm or indicator unit 90 (corresponding to unit 29 in FIG. 1). Both sides of the structure may be identical so that there are two of the electrically conductive support arms 84 provided the unit. Containers 91 may correspond to any of the previous containers described and may include conductive strips 92, corresponding to strips 54A and 54B in FIG. 7. These strips overlap the downwardly facing shoulder 93 and, in a preferred form of the invention, the strips 92 rest over a nub or rib 94. This nub 94 serves as a fulcrum for the support arm half 85, 86 so that there will be insured electrical contact of the conductive strip of the container with the supporting arm. This has proven somewhat more satisfactory than simply relying upon the straight edge of the supporting arm and the thin conductive strip.

In FIG. 11 a patient tube for a body fluid collection system is designated at PT, with vacuum tube VT leading to the vacuum system; conduit CO connects ports 95 and 96 of the lids of the respective container. The conduit PT and VT are connected to respective ports 97 and 98. Handle 99 may be secured to both post 83 by the respective attachments 88, the latter also serving to connect the electrical members together as seem in FIG. 15.

As to operation, the structure shown in FIGS. 11–15 operates as follows. The containers 91 are placed in the manner indicated in FIG. 11 on the supporting arms 85 and 86, and the tubes connected as shown. When the first container 91, the one on the right, fills to a level such that inner extremities of the contact strips 92 are engaged by the body fluid, then there will be electrical current conduction so as to cause the alarm of indicator 90 to ring, light, or perform some other function. At this point, the container 91 is rotated 90° so that the container strips appear in gap spaces between the respective arms 85. This effectively turns off the buzzer or alarm, but allows the suction operation to continue once the fluid level reaches and closes the bottom of port 96 (designed to be lower than the body fluid port 97).

There are many ways in which the structure illustrated in 11–15 may be supported. In FIG. 16, one method of construction is illustrated wherein the bed 81 is contiguous with the lip 80 which simply turns downwardly. The same may be made of fiberglass, plastic or other suitable material. A suitable filler or cement structure such as that shown at 100 and 101 may be incorporated such that a bottom Partition 102 may be included and secured to the structure by screws 103. Apertures 104 provide access for caster 105 to protrude therethrough. The casters form parts of caster units 106, which are secured in place by filler 100 in the manner shown.

In operation as to FIG. 16, the unit of FIG. 11 may be rolled over on a convenient surface such as floor, table, and so forth.

In FIG. 17 the alarm unit 29 includes a bracket 107 having support arms 108 and 109 secured thereto as by means of screws 110. The support arms are electrically conductive and serve as input leads to the indicator unit 29. The same may be mounted over wall bracket 112 at groove and flange areas 113 and 114. The details of the structure are further amplified in FIG. 18, which illustrates an interlocked configuration when the unit is actually mounted upon wall bracket 112.

In FIG. 19, container 115, which may be similar in any or all respects as to any of the other containers previously discussed, is connected to a battery supply 116 by lead 117 and also by leads 118 and 119 thereto via relay winding 120. Relay winding 120 forms a portion of relay 121 having arm 122 and contact 123. The latter are respectively connected by leads 124 and 125 to battery 126 and to solenoid winding 127 of solenoid valve 128. Valve 128 may be used to turn off conduction of vacuum line VC to vacuum pump 130. In practice, the solenoid valve 128 may be connected in series with, or even take the place of, indicator unit 29 (90 in FIG. 11). When a fluid level reaches the lower portions of the conductive strips of the container 115, see the corresponding container 10B in FIG. 7, then the circuit for battery 116 is closed. This closes the relay 121 at arm 122 and contact 123, so as to permit battery 126 to activate solenoid valve 128. The same will operate to turn valve 128 off, thereby terminating conduction through conduit or tube VC from the vacuum pump 130 to container 115.

Accordingly, it is seen by the construction of the present invention that control units and/or conduit related to container 115, or otherwise, may be actuated upon ascending fluid level reaching the contacts above referred to.

Throughout the specification and claims, the term "electric" and "electrical" shall include electronic and electro-mechanical devices, methods and systems; the fluid level "sensing" and/or "control" shall refer simply to the ascending level, of an electrical-parameter modifying liquid in a container, being used to alter the electrical characteristics of an external circuit coupled to said container and activated or otherwise modified upon such fluid ascent.

While particular embodiments of the present invention have been shown and described, it will be obvious to those skilled in the art that changes and modifications may be made without departing from this invention in its broader aspects.

We claim:

1. In combination, a medical, body-fluid, liquid-receiving container having a bottom, an inlet opening, a vacuum opening, and a pair of spaced electrical terminals affixed to, extending outside of, and communicating with the interior of said container, at least one of said terminals being spaced above said bottom, indicator means electrically coupled to said terminals and responsive to electrical current flow therebetween, through the liquid received by said container when said liquid rises to contact both of said terminals, to emanate a warning signal that a predetermined liquid level within said container has been reached, and a patient body-fluid exhaust tube connected to said inlet opening and structually and functionally isolated from said indicator means.

2. The combination of claim 1 wherein said indicator means comprises means for impressing a potential difference across said terminals, and means responsive to current flow between said terminals, through said liquid, to effect such warning signal emanation.

3. In combination, a vacuum opening liquid-receiving container having a bottom, an inlet opening, and a pair of spaced electrical terminals affixed to, extending outside of, and communicating with the interior of said container, at least one of said terminals being spaced above said bottom, and indicator means electrically coupled to said terminals and responsive to electrical current flow therebetween, through the liquid received by said container when said liquid rises to contact both of said terminals, to emanate a warning signal that a predetermined liquid level within said container has been reached, and wherein said indicator means includes a holder having a pair of mutually spaced electrical input means, said electrical terminals of said container being constructed and mutually spaced to be releasably supported by said electrical input means, to effect both electrical contact therewith and physical support thereby, said container being so disposed at said electrical terminals upon said electrical input means of said holder.

4. The combination of claim 3 wherein said input means comprises a pair of electrically conductive arms, said terminals electrically engaging said arms when said container is supported by said holder.

5. The combination of claim 3 wherein said input means comprises a pair of electrically conductive arms configured to form an opening, said container being configured to fit into said opening and, when so disposed therein, being in supportive engagement with said arms.

6. In combination, a medical, body-fluid, liquid-receiving container having an inlet opening, a vacuum opening, a bottom, and a pair of terminals at least one of which is spaced from said bottom, conduit means for providing fluid communicating between the interior of said container and an external object and electrical indicator means directly connected to said terminals and responsive to the presence of electrically conductive fluid within said container and contacting said terminals, for effecting an energized warning, detectable by the human senses, that a predetermined fluid level has been reached.

7. In combination, a container having an inlet opening, a vacuum opening and an annular wall providing an upper lip, and a pair of mutually spaced, doubled-back, electrically conductive strips disposed over said lip, depending within said container, and constructed for electrical contact with external electrical circuit means, and an electrically operated indicator as said electrical circuit means, engaging said strips, for emanating a signal to an operator, detectable by his senses, that a predetermined fluid level intercepting said conductive strips within said container has been reached, said indicator including a direct-coupled battery circuit closed by fluid within said container when engaging said conductive strips.

8. The combination of claim 7 wherein said container includes downwardly facing, support shoulder means, said electrically conductive strips being disposed transversely over said shoulder means.

9. The combination of claim 8 wherein said container is provided, at said shoulder means, with depending, raised protuberance means, said conductive strips being disposed over said protuberance means.

10. In combination, an electrically operative signal-emitting indicator unit constructed for support by an external object and having electrical input circuit means including electrically conductive, outwardly extending, arcuate arm means, a container having an inlet opening, a vacuum opening constructed for vertically medial support by said arcuate arm means and having electrical terminals communicating with the interior thereof and also disposed exterior thereof, said terminals being dimensioned to be in physically cooperative and electrical contact with said arm means, whereby said electrical input circuit means will be closed via said arcuate arm means and terminals when electrically conductive fluid within said container reaches the latter.

11. The combination of claim 10 wherein said container is provided with a lip, said terminals comprising mutually spaced, doubled-back conductive strips disposed over said lip of said container.

12. The combination of claim 11 wherein said container includes downwardly facing shoulder means, said conductive strips traversing said shoulder means.

13. The combination of claim 12 wherein said downwardly facing shoulder means includes fulcrum protuberance means disposed beneath said conductive strips.

14. In combination, support structure defining a post and a base supporting said post, support means extending outwardly from said post, container structure releasably engaging and, thereby, being supported by said support means, said container structure including a bottom and also mutually spaced electrical terminals communicating with the interior of said container structure, at least one of said terminals being disposed above said bottom, and electrical indicator means fixedly disposed with respect to said post and in electrical conductivity with said terminals for effecting a warning signal during the continued rise of fluid within said container structure, said container structure being constructed to permit such continued rise.

15. In combination, a pair of liquid-receiving vacuum-operated containers each defining an interior, having a bottom, and being provided with a pair of electrical means communicating with said interior, at least one of said electrical means of each of said containers being disposed above said bottom, support means constructed to support said containers, electrical indicator means for producing an intelligence signal upon liquid rise within said containers to said electrical means, and electrical circuit means for electrically coupling in parallel said electrical means of each of said containers with said indicator means, said containers and support means being constructed and arranged such that predetermined movement of a selected one of said containers will interrupt said electrical coupling of such container's electrical means with said electrical indicator means.

* * * * *